United States Patent
Oh

(10) Patent No.: US 9,874,465 B2
(45) Date of Patent: Jan. 23, 2018

(54) POINTER FOR INSTRUMENT CLUSTER OF VEHICLE

(71) Applicants: HYUNDAI MOTOR COMPANY, Seoul (KR); KIA MOTORS CORPORATION, Seoul (KR)

(72) Inventor: Sei Young Oh, Suwon-si (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 157 days.

(21) Appl. No.: 14/959,505

(22) Filed: Dec. 4, 2015

(65) Prior Publication Data

US 2017/0010138 A1   Jan. 12, 2017

(30) Foreign Application Priority Data

Jul. 7, 2015  (KR) .................. 10-2015-0096427

(51) Int. Cl.
  *G01D 11/28* (2006.01)
  *G01D 13/26* (2006.01)

(52) U.S. Cl.
  CPC ........... *G01D 13/265* (2013.01); *G01D 11/28* (2013.01)

(58) Field of Classification Search
  CPC ....... G01D 11/28; G01D 13/22; G01D 13/265
  USPC ........... 116/286, 287, 288, DIG. 6, DIG. 36; 362/23.12, 23.13, 23.19, 23.2, 23.21
  See application file for complete search history.

(56) References Cited

U.S. PATENT DOCUMENTS

| | | | |
|---|---|---|---|
| 6,189,480 B1 * | 2/2001 | Staley et al. ........... | G01D 11/28 116/288 |
| 7,163,303 B1 * | 1/2007 | Venkatram ............. | B60K 37/02 362/23.15 |
| 9,003,998 B2 * | 4/2015 | Guillauminaud ...... | G01D 11/28 116/286 |
| 9,365,159 B2 * | 6/2016 | Birman et al. ........ | G01D 13/265 |
| 2015/0138751 A1 * | 5/2015 | Sherman et al. ...... | G01D 11/28 362/23.21 |

FOREIGN PATENT DOCUMENTS

| | | | | |
|---|---|---|---|---|
| JP | 9-21655 | | 1/1997 | |
| JP | 3023870 B2 * | | 3/2000 | ............. G01D 13/22 |
| JP | 2012008092 A * | | 1/2012 | ............. G01D 13/22 |
| JP | 4914700 | | 4/2012 | |
| JP | 5110687 B2 * | | 12/2012 | ............. G01D 13/22 |
| JP | 5184047 B2 * | | 4/2013 | ............. G01D 13/22 |

(Continued)

*Primary Examiner* — R. A. Smith
(74) *Attorney, Agent, or Firm* — Brinks Gilson & Lione

(57) ABSTRACT

A pointer to indicate gradations formed in a dial of a vehicle instrument cluster includes: a pointer blade to receive and emit light received from the lower portion of the dial when a blade body formed integrally with a blade arm is rotatably supported above the dial; a pointer weight disposed adjacent to a rear surface of the blade body and having a light through-hole to allow light received from the lower portion of the dial to pass through the pointer weight; a light pin part extending to the rear surface of the blade body from one end of the blade arm and inserted into the light through-hole; and a weight supporter, fit between the pointer blade and the pointer weight and below the light through-hole to receive light from the lower portion of the dial and transfer the light to the pointer blade.

4 Claims, 5 Drawing Sheets

(56) References Cited

FOREIGN PATENT DOCUMENTS

| | | |
|---|---|---|
| JP | 2014-85334 A | 5/2014 |
| KR | 10-2005-0119793 | 12/2005 |
| KR | 10-2006-0022837 | 3/2006 |
| KR | 10-2011-0072484 | 6/2011 |
| KR | 10-1056588 | 8/2011 |

\* cited by examiner

POINTER FOR INSTRUMENT CLUSTER OF VEHICLE

CROSS-REFERENCE TO RELATED APPLICATION

This application claims priority to Korean Patent Application No. 10-2015-0096427, filed on Jul. 7, 2015, the entire contents of which is incorporated herein by reference.

FIELD

The present disclosure relates to a pointer for an instrument cluster of a vehicle, which is used for improving illumination quality.

BACKGROUND

In general, an instrument cluster is provided in front of a driver's seat of a vehicle, and various instruments are provided in the instrument cluster, which display vehicle states such as a driving speed of the vehicle, an engine RPM, a quantity of fuel, and the like, so a driver will know the vehicle states. Analog type and digital type instruments are used as the instruments of the cluster, and a pointer rotatably provided in the analog type instrument indicates gradations formed in a dial.

The pointer provided in the instrument cluster in the related art emits light emitted by an illumination device to provide visibility to a driver in order to allow the driver to identify the point even when it is dark, such as during night driving.

FIG. 6 is a diagram schematically illustrating a light transferring path of a pointer for an instrument cluster for a vehicle in the related art.

As illustrated in FIG. 6, the pointer for the instrument cluster in the related art includes a pointer blade 1 that, to emit light, receives light emitted by a light source (not illustrated) installed below a dial 4, a blade supporter 2 rotatably supporting the pointer blade 1 above the dial 4, and a pointer cap 3 covering one side of the pointer blade 1, wherein the pointer blade 1 indicating the gradation of the dial 4 emits the light emitted by the light source to indicate vehicle state information displayed in an instrument of the instrument cluster even when it is dark.

However, the pointer for the instrument cluster in the related art has a structure in which the light from the light source is concentrated on the center of the pointer cap 3, and as a result, a residual portion (indirect light portion) that penetrates the blade supporter 2 is low in luminance of illumination, the residual portion being a portion other than a portion (direct light portion) where the pointer blade 1 directly receives light of the light emitted by the light source.

In other words, the pointer for the instrument cluster in the related art has a problem of nonuniformity of illumination, due to insufficient illumination at an end of the pointer blade, because the light of the light source is not sufficiently transferred to the end of the pointer blade.

The problem more clearly occurs as the length of the pointer blade increases, and in particular, when the light source has a white color, because the light source then has a shorter wavelength than a light source having a red color, and as a result, the problem of nonuniformity of illumination becomes further noticeable.

The above information disclosed in this Background section is only for enhancement of understanding of the background of the disclosure and therefore it may contain information that does not form prior art already known to a person of ordinary skill in the art.

SUMMARY

The present disclosure has been made in an effort to solve the above-described problems associated with related art and to provide a pointer for an instrument cluster of a vehicle, which improves illumination quality of the pointer for the instrument cluster by providing balanced illumination of a pointer blade and reducing a nonuniform illumination phenomenon.

The present disclosure provides a pointer for an instrument cluster of a vehicle, configured to indicate gradations formed in a dial of the instrument cluster, the pointer including: a pointer blade configured to receive light received from a lower portion of the dial, and to emit light, when a blade body formed integrally with a blade arm is rotatably supported above the dial; a pointer weight disposed adjacent to a rear surface of the blade body and having a light through-hole, the light through-hole configured to allow the light received from the lower portion of the dial to pass through the pointer weight; a light pin part extending to the rear surface of the blade body from one end of the blade arm and inserted into the light through-hole; and a weight supporter, fit between the pointer blade and the pointer weight and below the light through-hole, and that is configured to receive light from the lower portion of the dial and transfer the light received from the lower portion of the dial to the pointer blade.

The pointer blade may be configured so that when light received from the lower portion of the dial irradiates a bottom of the weight supporter, the pointer blade may emit light by receiving, through the rear surface of the blade body adjacent to the weight supporter and through the light pin part inserted into the light through-hole below the pointer weight, the light the weight supporter received from the lower portion of the dial.

The pointer for the instrument cluster may further include a pointer supporter configured to rotatably support the pointer blade above the dial, wherein the pointer supporter may include a support plate to which the blade body, the pointer weight, and the weight supporter are fixedly fit, and a supporter, formed below the support plate, that is configured to receive rotational power.

The pointer for the instrument cluster may further include a pointer cap configured to be held on the blade body of the pointer blade, wherein in the pointer cap, a cap rib surrounding the blade arm may integrally extend on one side of a cap body surrounding the blade body, and the cap rib may have a top opening for exposing a top of the blade arm.

According to the present disclosure, the pointer for the instrument cluster of the vehicle is configured in an enhanced structure that takes into consideration a factor influencing existing pointers' illumination to improve balance of illumination and light leakage of the pointer, thereby increasing illumination quality.

Other aspects and forms of the disclosure are discussed below.

The terms "vehicle" or "vehicular" or other similar terms as used herein are inclusive of motor vehicles in general, such as passenger automobiles including sports utility vehicles (SUV), buses, trucks, various commercial vehicles, watercraft including a variety of boats and ships, aircraft, and the like, and include hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The above and other features of the disclosure are discussed below.

DRAWINGS

The above and other features of the present disclosure will now be described in detail with reference to certain exemplary forms thereof illustrated in the accompanying drawings, which are given hereinbelow by way of illustration only, and thus are not limitative of the present disclosure, and wherein.

Figure 1:
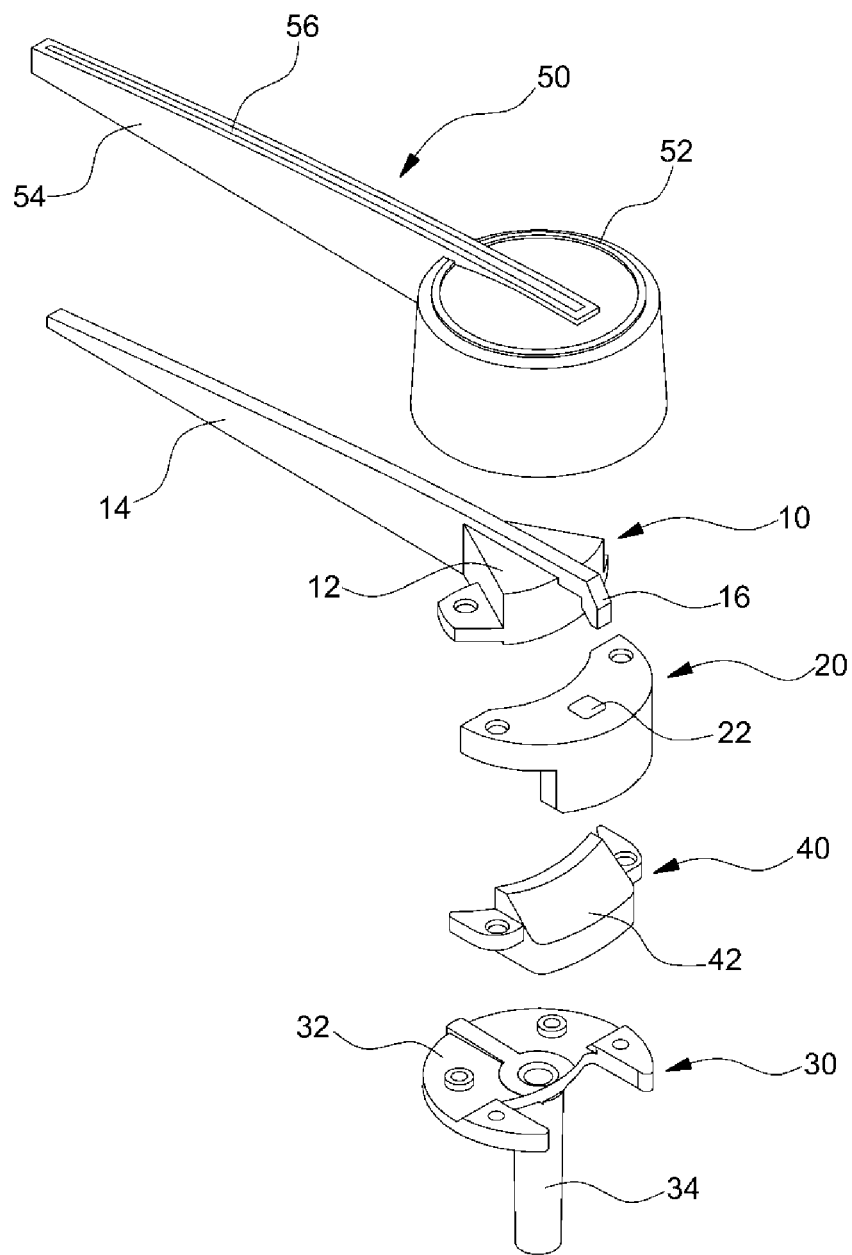
FIG. 1 is an exploded perspective view illustrating a pointer for an instrument cluster.

Reference numerals set forth in the Drawings includes reference to the following elements as further discussed below:

10: pointer blade
12: blade body
14: blade arm
16: light pin part
20: pointer weight
22: light through-hole
30: pointer supporter
32: support plate
34: supporter
40: weight supporter
42: inclination surface
50: pointer cap
52: cap body
54: cap rib
56: top opening
60: dial It should be understood that the appended drawings are not necessarily to scale, and present a somewhat simplified representation of various features illustrative of the basic principles of the disclosure. Specific design features of the present disclosure as disclosed herein, including, for example, specific dimensions, orientations, locations, and shapes, will be determined in part by the particular intended application and use environment.

In the figures, reference numbers refer to the same or equivalent parts of the present disclosure throughout the several figures of the drawing.

DETAILED DESCRIPTION

Hereinafter reference will be made in detail to various forms of the present disclosure, examples of which are illustrated in the accompanying drawings and described below. While the disclosure will be described in conjunction with exemplary forms, it will be understood that present description is not intended to limit the disclosure to those exemplary forms. On the contrary, the disclosure is intended to cover not only the exemplary forms, but also various alternatives, modifications, equivalents and other embodiments, which may be included within the spirit and scope of the invention as defined by the appended claims.

Hereinafter, a form of the present disclosure will be described with reference to the accompanying drawings, so as to be easily implemented by those skilled in the art.

Figure 2:
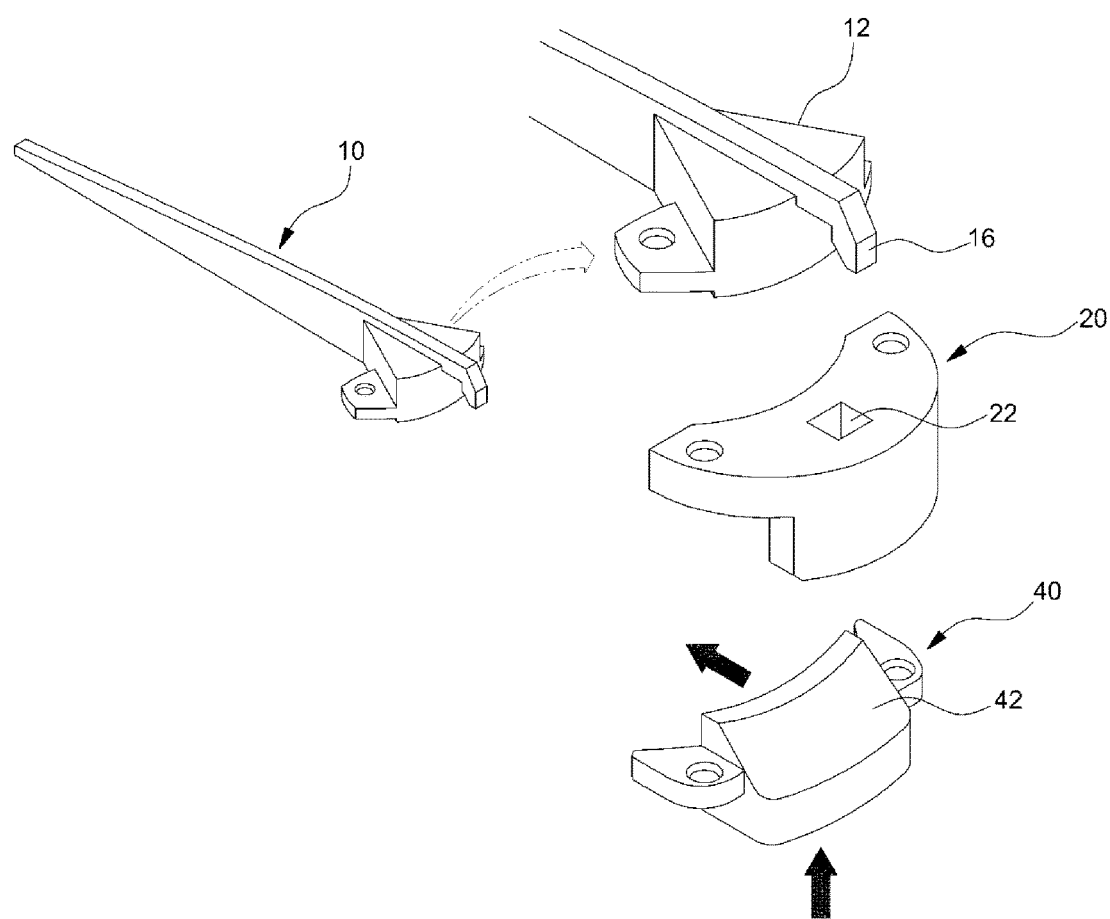
FIG. 2 is a partial perspective view illustrating a principal part of the pointer for the instrument cluster.
Figure 3A:
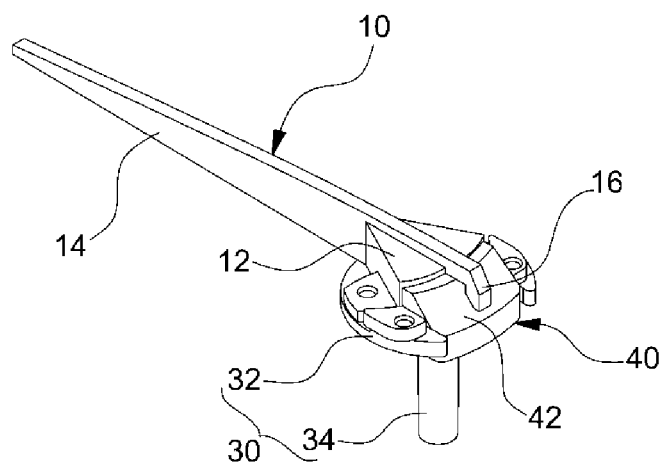
FIG. 3A and FIG. 3B are diagrams describing partial assembly structures of the pointer for the instrument cluster.
Figure 3B:
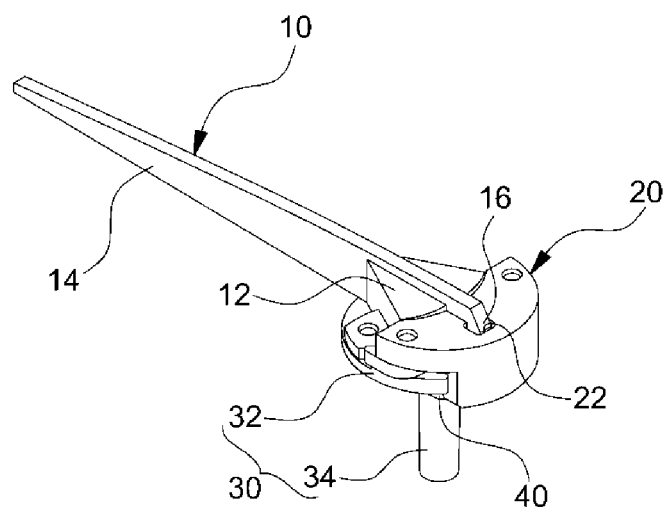

A pointer for an instrument cluster is configured to indicate gradations formed in a dial of an instrument cluster, and is configured to include a pointer blade 10, a pointer weight 20, and a weight supporter 40, and the like, as illustrated in FIGS. 1 and 2, in order to reduce a deviation in brightness of a pointer caused by incidence and distribution of light from a light source emitted from the lower portion of the dial of the instrument cluster.

The pointer blade 10, which is made of a transparent material that may emit light of the received emitted light, is constituted by a blade body 12, and a blade arm 14 that is formed integrally with the blade body 12 to extend straightly in one direction.

The pointer blade 10 is configured to be rotatably disposed above a dial (see reference numeral 60 of FIG. 5) of the instrument cluster to indicate gradations formed on the surface of the dial.

The pointer blade 10 is configured in such a manner that the blade body 12 is fit onto a support plate 32 of the pointer supporter 30 to rotate integrally with the pointer supporter 30. The blade arm 14 is configured to indicate the gradations on the surface of the dial while rotating integrally with the blade body 12.

The pointer supporter 30, which is configured to rotatably support the pointer blade 10 above the dial 60, is constituted by the support plate 32, to which the blade body 12, the pointer weight 20, and the weight supporter 40 are fixedly fit, and a supporter 34 that is integrally formed below the support plate 32 and connected with a rotational shaft of a step motor (not illustrated) to receive rotational power.

Although not illustrated, in general, a circuit board with the light source is disposed below the dial of the instrument cluster, and the rotational shaft of the step motor, which penetrates the circuit board, is connected with the supporter 34 of the pointer supporter 30. As a result, the pointer supporter 30 and the pointer blade 10 are configured to be rotationally driven by the step motor.

The pointer blade 10 is configured to indicate the gradations formed on the surface of the dial based on the rotational position of pointer blade 10, and to indirectly receive light emitted by and received from a light source (not illustrated) disposed below the dial.

The pointer blade 10 includes a light pin part 16 that integrally extends on a rear end (a portion integrally formed with the blade body) of the blade arm 14.

The light pin part 16 extends from the rear end of the blade arm 14 to a curved rear surface of the blade body 12, and forms on one side of the blade body 12 an approximately "L" shaped structure.

The pointer weight 20 adjusts a weight balance by preventing the pointer blade 10, having the blade arm 14 extending to one side of the blade body 12, from being inclined to one side by the weight of the blade arm 14. Pointer weight 20 has a light through-hole 22, which may allow the light emitted by and received from the lower portion of the dial to pass through a center of pointer weight 20, as illustrated in FIG. 2.

As illustrated in FIGS. 3A to 5, the light pin part 16 is fit to the light through-hole 22 in such a manner that one side of the light pin part 16 is inserted into the light through-hole 22, and as a result, the light that passes through the light through-hole 22 is incident in the light pin part 16.

The pointer weight 20 is disposed adjacent to the rear surface of the blade body 12 while the light pin part 16 is fit to the light through-hole 22.

The weight supporter 40 is configured to receive and transmit the light emitted by and received from the lower portion of the dial and to transfer the light to the pointer blade 10, and since the light emitted by and received from lower portion of the dial irradiates only the bottom of the weight supporter 40, the weight supporter 40 prevents the light emitted by and received from the lower portion of the dial from being directly received by the pointer blade 10 including the light pin part 16, and allows all of the light transferred to the pointer blade 10 to become incident in the pointer blade 10 indirectly, through the weight supporter 40.

The weight supporter 40 is formed of a material and in a shape configured to transfer the light to the pointer blade 10 by transmitting the light irradiating the bottom of weight supporter 40. Weight supporter 40 is disposed between the blade body 12 and the pointer weight 20 and below the light through-hole 22 of the pointer weight 20.

The weight supporter 40 is fixedly fit to the support plate 32 of the pointer supporter 30 while being inserted into a space surrounded by the blade body 12 and the pointer weight 20, and is adjacent to the rear surface of the blade body 12 inside and below the pointer weight 20.

Figure 4:
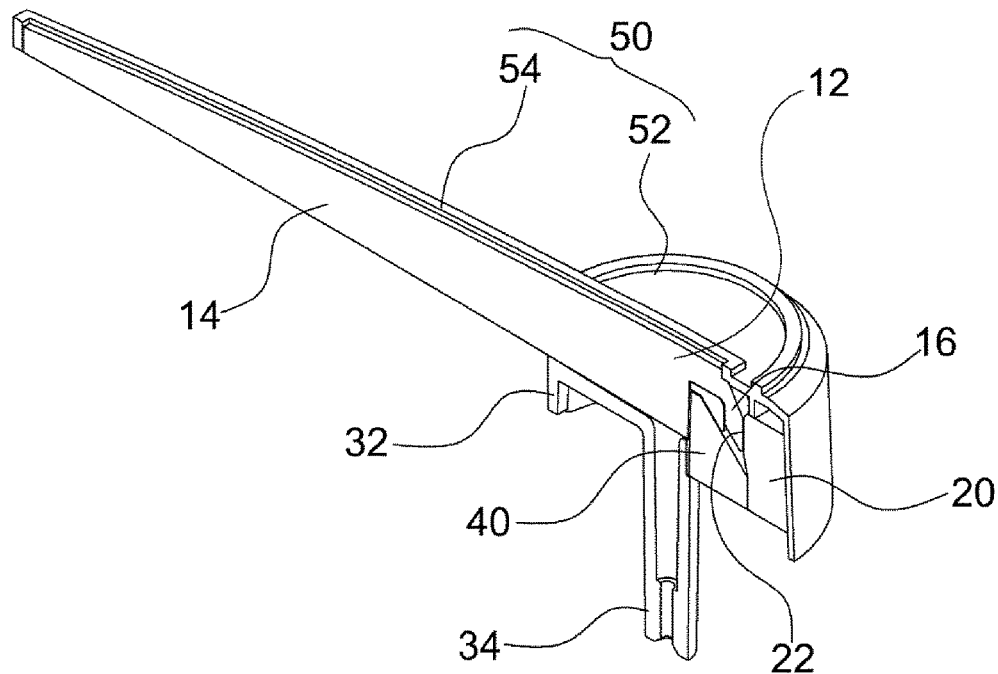
FIG. 4 is a cutout perspective view illustrating the pointer for the instrument cluster.

In FIG. 4, a pointer cap 50 that surrounds the blade body 12 and exposes the top of the blade arm 14 is configured to be fit onto the pointer blade 10 while being held on the blade body 12.

In the pointer cap 50, a cap rib 54 surrounding the blade arm 14 integrally extends to one side of the cap body 52 surrounding the blade body 12. The cap rib 54 has a top opening 56 for exposing the top of the blade arm 14.

Figure 5:
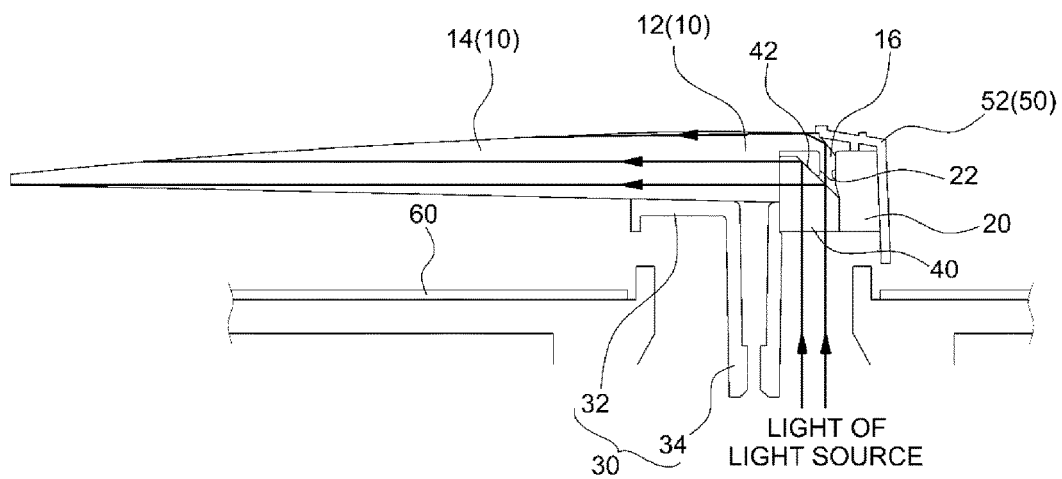
FIG. 5 is a schematic view illustrating a transferring path of light received by the pointer for the instrument cluster.
Figure 6:
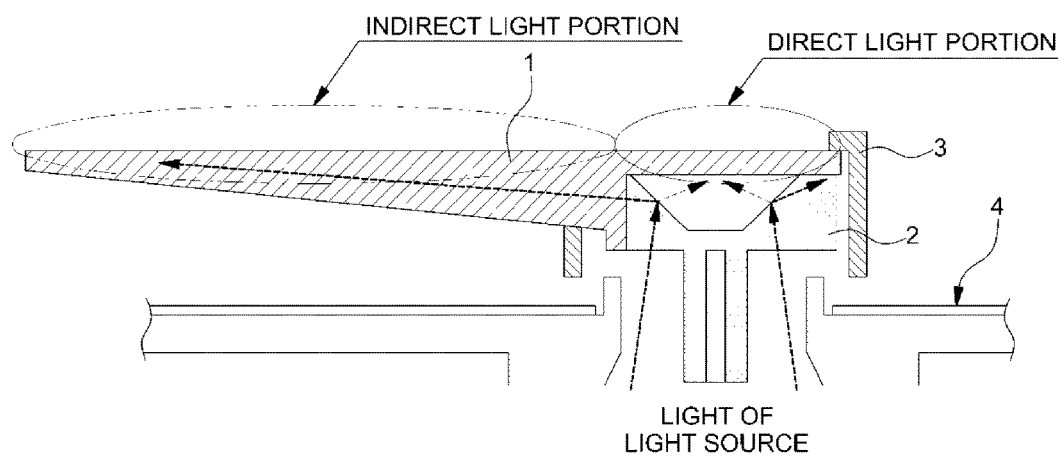
FIG. 6 is a diagram schematically illustrating a light transferring path of a pointer for an instrument cluster of a vehicle in the related art.

In FIG. 5, the pointer blade 10 is configured to receive and emit the light received by the bottom of the weight supporter 40 and more specifically, is configured to emit light received by the rear surface of the blade body 12 adjacent to the weight supporter 40, and by the light pin part 16, from the weight supporter 40.

That is, some of the light vertically irradiating the bottom of the weight supporter 40 is refracted at an inclination surface 42 of the weight supporter 40 contacting the pointer weight 20, so as to become horizontally incident in the blade body 12 and the blade arm 14 of the pointer blade 10. Additionally, some of the light becomes incident in the light pin part 16 by penetrating the inclination surface 42 through the light through-hole 22, and then becomes incident in the blade body 12 and the blade arm 14 of the pointer blade 10 by being refracted in a predetermined direction.

As a result, since all of light received by the pointer blade 10 is indirect light transferred to the pointer blade 10 by the weight supporter 40, the blade arm 14 of the pointer blade 10 emits light evenly from the rear end to the other end to reduce a deviation in brightness as compared with the related art pointer for an instrument cluster in which the deviation in brightness occurs due to light distribution in a direct light part and an indirect light part.

That is, as compared with related art, the light received by the pointer blade 10 is not concentrated on the rear end of the blade arm 14, and instead reaches the other end of the blade arm 14 to reduce the deviation in brightness found in the related art.

The disclosure has been described in detail with reference to preferred forms thereof. However, it will be appreciated by those skilled in the art that changes may be made in these forms without departing from the principles and spirit of the invention, the scope of which is defined in the appended claims and their equivalents.

What is claimed is:

1. A pointer for an instrument cluster of a vehicle, configured to indicate gradations formed in a dial of the instrument cluster, the pointer comprising:
    a pointer blade configured to receive light received from a lower portion of the dial, and to emit light, when a blade body formed integrally with a blade arm is rotatably supported above the dial;
    a pointer weight disposed adjacent to a rear surface of the blade body and having a light through-hole, the light through-hole configured to allow the light received from the lower portion of the dial to pass through the pointer weight;
    a light pin part extending to the rear surface of the blade body from one end of the blade arm and inserted into the light through-hole; and
    a weight supporter, fit between the pointer blade and the pointer weight and below the light through-hole, that is configured to receive light from the lower portion of the dial and to transfer the light received from the lower portion of the dial to the pointer blade.

2. The pointer of claim 1, wherein the pointer blade is configured so that when the light received from the lower portion of the dial irradiates a bottom of the weight supporter, the pointer blade will emit light by receiving, through the rear surface of the blade body adjacent to the weight supporter and through the light pin part inserted into the light through-hole below the pointer weight, the light the weight supporter received from the lower portion of the dial.

3. The pointer of claim 1, further comprising:
    a pointer supporter configured to rotatably support the pointer blade above the dial, wherein the pointer supporter includes:
        a support plate to which the blade body, the pointer weight, and the weight supporter are fixedly fit; and
        a supporter, formed below the support plate, that is configured to receive rotational power.

4. The pointer of claim 1, further comprising:
    a pointer cap configured to be held on the blade body of the pointer blade, wherein in the pointer cap, a cap rib surrounding the blade arm integrally extends on one side of a cap body surrounding the blade body, and the cap rib has a top opening for exposing a top of the blade arm.

* * * * *